United States Patent
Rolandson

(10) Patent No.: US 10,577,980 B2
(45) Date of Patent: Mar. 3, 2020

(54) RANKINE SYSTEM WITH BYPASS VALVE

(71) Applicant: Volvo Car Corporation, Göteborg (SE)

(72) Inventor: Ola Rolandson, Vänersnäs (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/167,574

(22) Filed: Oct. 23, 2018

(65) Prior Publication Data

US 2019/0136719 A1    May 9, 2019

(30) Foreign Application Priority Data

Nov. 7, 2017 (EP) .................................. 17200230

(51) Int. Cl.
| | |
|---|---|
| *F01K 13/02* | (2006.01) |
| *F01K 23/06* | (2006.01) |
| *F01K 23/10* | (2006.01) |
| *F16K 1/54* | (2006.01) |
| *F01K 27/02* | (2006.01) |

(Continued)

(52) U.S. Cl.
CPC ............ *F01K 13/02* (2013.01); *F01K 23/065* (2013.01); *F01K 23/101* (2013.01); *F01K 27/02* (2013.01); *F01N 5/02* (2013.01); *F02B 39/085* (2013.01); *F02G 5/04* (2013.01); *F16K 1/36* (2013.01); *F16K 1/54* (2013.01); *F16K 31/04* (2013.01); *F01N 2240/02* (2013.01); *F02G 2260/00* (2013.01)

(58) Field of Classification Search
CPC ........ F01K 13/02; F01K 27/02; F01K 23/101; F01K 23/065; F16K 1/54; F16K 31/04; F16K 1/36; F02G 5/04; F02G 2260/00; F02B 39/085; F01N 5/02; F01N 2240/02

USPC ................................... 60/646, 657, 660, 661
See application file for complete search history.

(56) References Cited

U.S. PATENT DOCUMENTS

| | | | |
|---|---|---|---|
| 3,999,787 A * | 12/1976 | Park .................. | F01D 17/24 |
| | | | 290/40 R |
| 8,820,078 B1 * | 9/2014 | Duffy .................. | F22B 1/00 |
| | | | 60/646 |

(Continued)

FOREIGN PATENT DOCUMENTS

| | | |
|---|---|---|
| DE | 19502539 A1 | 8/1996 |
| WO | 2010091851 A2 | 8/2010 |

OTHER PUBLICATIONS

Apr. 18, 2018 European Search Report issue on International Application No. EP17200230.

*Primary Examiner* — Hoang M Nguyen
(74) *Attorney, Agent, or Firm* — Clements Bernard Walker; Christopher L. Bernard

(57) ABSTRACT

The present invention relates to a Rankine system comprising a valve including a valve member. The valve member is provided with a valve controlling element in the form of an elongated tapered end portion with a tip end facing the duct, wherein the tapered end portion is arranged to be inserted through the opening and into the duct as the valve member is moved towards the valve seat. The actuator is configured to hold the valve member in at least one intermediate position between the first and second end positions, where the tapered end portion occupies a portion of a cross-sectional fluid through-flow area defined by the duct so as to partly restrict a flow of fluid through the duct.

14 Claims, 4 Drawing Sheets

(51) Int. Cl.
*F01N 5/02* (2006.01)
*F02B 39/08* (2006.01)
*F02G 5/04* (2006.01)
*F16K 1/36* (2006.01)
*F16K 31/04* (2006.01)

(56) References Cited

U.S. PATENT DOCUMENTS

| | | |
|---|---|---|
| 9,932,862 B2* | 4/2018 | Gibble .................... F01K 13/02 |
| 2015/0084346 A1* | 3/2015 | Tomigashi .............. F01K 13/02 |
| | | 290/40 R |
| 2015/0176482 A1 | 6/2015 | Haraguchi et al. |
| 2015/0267638 A1 | 9/2015 | Morris et al. |
| 2016/0130981 A1* | 5/2016 | Grelet .................... F01K 23/065 |
| | | 60/616 |
| 2016/0208636 A1 | 7/2016 | Ooishi et al. |
| 2016/0230903 A1 | 8/2016 | Hagnauer |

* cited by examiner

RANKINE SYSTEM WITH BYPASS VALVE

CROSS-REFERENCE TO RELATED APPLICATION

The present patent application/patent claims the benefit of priority of co-pending European Patent Application No. 17200230.5, filed on Nov. 7, 2017, and entitled "RANKINE SYSTEM WITH BYPASS VALVE," the contents of which are incorporated in full by reference herein.

TECHNICAL FIELD

This invention relates to a valve device. In particular, the invention relates to a valve device arranged as a bypass valve in a Rankine system for recovering of waste heat from an internal combustion engine. The invention also relates to a system of said type and a vehicle provided with such a system.

BACKGROUND OF THE INVENTION

There is a general desire to increase the energy efficiency of internal combustion engines used for powering of vehicles. One way of doing this is to utilize the waste heat of the engine using a Rankine system where a recirculating fluid in an evaporation step takes up heat from the exhaust gas or the cooling water of the engine and returns the energy/power to the engine via e.g. an expander turbine connected to a generator. A system of this type also includes a condenser and a pump for recirculating the fluid. An example of such a system is disclosed in US2015/0176482.

Systems of the above type typically include a by-pass passage for allowing the fluid to fully or partly by-pass the expander during recirculation. Without such a by-pass passage, evaporated fluid may push liquid fluid forward in the system towards the expander that may be damaged if designed to handle only fluid in vapour form. A by-pass valve is used to switch between (partial) by-pass flow and operation flow where the fluid passes through the expander. When building up of the pressure in the system during a starting phase the by-pass valve is typically set in a partially open position to provide a certain back pressure and a partial flow through both passages. When the pressure and temperature have reached a certain level the valve is closed and the system can start operating.

SUMMARY

A conventional solenoid valve is commonly used as by-pass valve in this kind of systems; such valves are well suited for the high pressures involved. A solenoid valve is an electromagnetically operated binary valve that switches the valve on or off (or that switches between two outlet ports). Typically, a valve seat is arranged around a duct opening and a valve member can be positioned (by feeding current through the solenoid coil) in two positions: either at an axial distance from the seat/opening or in close contact with the seat so as to close the opening. A spring may be used to keep the valve member in either of its two positions when the solenoid is not energized, i.e. the valve can be kept in either a normally closed or normally open position.

To control the flow through a solenoid valve, e.g. for the purpose of providing the partial flow through both passages during the starting phase of the system described above, the valve is switched on or off at a certain frequency that results in a certain partial flow. This is often denoted pulse-width modulation (PWM) control. The frequent opening and closing of the valve during PWM control of solenoid valves generates a ticking sound.

In general this ticking sound is not in issue, it may even be appreciated as an indication that the valve works as it should. However, the inventor has realized that if a system of the above type is installed in a passenger car the ticking sound is likely to be perceived as a disturbing or alarming ticking noise, in particular during the starting phase of the system where the ticking can go on for some time. In trucks or other industrial vehicles the ticking valve can be placed rather far away from the drivers cab, or the valve sound may not be perceived as disturbing anyway because there is usually a more significant background sound level in industrial vehicles than in passenger cars.

Improvements of Rankine systems of the above type are thus needed to make the technique suitable for passenger cars.

An object of this invention is thus to provide a system of the above type that produces less noise compared to conventional systems. This object is achieved by the valve device, system and vehicle defined by the technical features contained in the independent claims. The dependent claims contain advantageous embodiments, further developments and variants of the invention.

The invention concerns a Rankine system including a valve device comprising: a duct and a duct opening; a valve seat arranged circumferentially around the duct opening and facing away from the duct; a movable valve member for restricting a flow of fluid through the duct; and a valve actuator for moving the valve member. The valve member and the valve actuator are arranged on an opposite side of the duct opening in relation to the duct, wherein the valve member is provided with a valve sealing element in the form of a sealing surface for sealing against the seat around the duct opening, wherein the valve member is movable towards and away from the duct opening in an axial direction thereof, wherein the valve seat and the sealing surface face each other in the axial direction so as to, when brought in contact with each other, define a first end position of the valve member in which the valve device is closed, wherein the valve member is movable between the closed first end position and a second end position in which the valve member sealing surface is located at an axial distance from the valve seat and the valve device is open, and wherein the valve actuator is configured to move the valve member between the first and second end positions.

The invention is characterized in that the valve member in addition to the valve sealing element is provided with a valve controlling element in the form of an elongated tapered end portion with a tip end facing the duct, wherein the tapered end portion is arranged to be inserted through the opening and into the duct as the valve member is moved towards the valve seat, wherein the actuator is configured to be capable of holding the valve member in at least one intermediate position between the first and second end positions, in which intermediate position the tapered end portion occupies a portion of a cross-sectional fluid through-flow area defined by the duct so as to partly restrict a flow of fluid through the duct.

The inventive valve device thus forms a sort of combination of a binary on-off valve that provides for 0% or 100% through-flow at the two end positions and a slide or needle valve that can be set in a position in between the end positions for controlling the flow without having to switch the valve on or off at a certain frequency (PWM). Accordingly, a steady partial flow through the duct and the valve device can be achieved without the ticking noise associated with solenoid valves. Because the valve device is provided with the valve seat around the opening that axially faces the sealing surface of the valve member, and not only the tapered end portion of the valve member that rather seals in a radial direction, the valve device still provides for a firm closure of the valve that can completely restrict any fluid from flowing through the valve device, even at high pressures. Further, the inventive valve device may still be operated in a similar way as a conventional solenoid valve if desired, i.e. either fully closed or fully open.

That the valve seat is arranged around the opening and faces away from the duct means that it generally faces the matching sealing surface of the valve member also when the valve member sealing surface is located at a distance from the valve seat. When the valve member is in its first end position, a further force onto the valve member towards the seat and the duct presses the seat and the matching seal surface further together. The tapered end portion, on the other hand, seals or partly seals in a generally radial direction towards inner walls of the duct.

The valve seat may be somewhat inclined in a radial direction, it may for instance form a chamfering around the opening with some slope towards a longitudinal centre axis; the seat is still considered to generally face away from the duct. Further, the valve seat may comprise portions that face in a direction that deviate significantly from that of the valve seat surface in general.

The tip end need not necessarily be a sharp tip; the tapered end portion may for instance have a frusto-conical shape (a truncated cone). The tip end may be rounded in different ways.

A further advantage of the inventive valve device compared to conventional solenoid valves is that the wear and tear of the device is decreased. Solenoid valves need to be closed and opened a large number of times to keep a partial flow, which eventually wears out the valve.

In an embodiment of the invention the actuator is configured to be capable of holding the valve member in a plurality of intermediate positions between the first and second end positions, in which plurality of positions the tapered end portion occupies a varying portion of the cross-sectional through-flow area of the duct and thus to a different degree restricts a flow of fluid through the duct. This improves the control of the flow. The actuator may be configured to move the valve member in a step-less manner or in very small steps to provide for fine tuning of the flow.

In an embodiment of the invention the actuator is arranged to exert a linear force onto the valve member. Preferably the actuator comprises an electric motor. Different linear servo motors may be used. For accurate controlling the electric motor may be provided with a high gear ratio.

In an embodiment of the invention the actuator comprises a spring. Preferably the actuator comprises both an electric motor and a spring. The spring is preferably arranged to exert a pressure onto the valve member in a direction towards the valve seat so as to close the valve device. The spring can be used to manage tolerances and protect the valve seat from deforming when closing the valve. (It may be difficult to exactly adjust the distance to the valve seat and a strong actuator might damage the seat, the spring can complement the actuator when closing the valve).

If the fluid is intended to flow in a direction through the duct towards the opening and the valve member it will exert a pressure onto the valve member. In such a case the spring can be adapted to allow opening of the valve device at a certain pressure threshold; the valve device can thus work also as release valve. If the fluid is intended to flow in the opposite direction a release valve may be arranged in a parallel duct.

In an embodiment of the invention the actuator is arranged at an end portion of the valve member opposite to the elongated tapered end portion. The valve member preferably extends through a passage in a wall of some enclosure and the actuator, for instance both an electric motor and a spring, may be arranged outside of such an enclosure.

In an embodiment of the invention the shape of the tapered end portion in relation to the cross-sectional through-flow area of the duct is such that a certain linear movement of the valve member results in a smaller change of the duct's cross-sectional through-flow area when the valve member is close to its first end position than when the valve member is close to its second end position. This means that a small change in the position of the valve member results in a small change of the flow rate through the duct when the valve device is close to closed but to a large change of the flow rate when the valve device is close to fully open. In turn this means that small flows can be controlled with a high accuracy and sensitivity and that is possible to go rather quickly from, say, 70% flow to a fully open valve device with 100% through-flow. This allows fine tuning of small flows but reduces the total length of the valve member and makes the valve device more compact.

In an embodiment of the invention the shape of the tapered end portion in relation to the cross-sectional through-flow area of the duct is such that, at least along half of the length of the tapered end portion in the axial direction thereof, the cross-sectional through-flow area varies substantially linearly with the axial position of the valve member. Accordingly, further insertion of the tapered end portion into the duct by e.g. 10% of its total length (i.e. a further insertion of the tapered end portion from e.g. 80% of its length to 88% of its length) leads to a linear 10% decrease of the duct's cross-sectional through-flow area and thus a 10% decrease of the flow through the duct. This simplifies the control of the flow.

In an embodiment of the invention the tapered end portion has a conical shape, preferably the shape of a circular cone.

In an embodiment of the invention the duct has a circular cross-sectional through-flow area with a constant diameter at least along a distance corresponding to the tapered end portion when fully inserted into the duct. The duct opening is typically arranged at some kind of surface and also the duct opening and the valve seat have typically a circular shape.

If the tapered end portion has the shape of a circular cone and the duct has a circular cross-sectional through-flow area at the opening thereof, the cross-sectional through-flow area at the duct opening becomes the circular cross-sectional area of the duct minus the circular cross-sectional area occupied by the conical tapered end portion, where the size of the latter depends on how far the end portion has been inserted into the duct and the particular shape (length, width, angle) of the cone. The base of the cone may have a width corresponding to the inner diameter of the duct at the opening (minus some play to avoid that the valve member gets stuck in the duct) so as to contribute as much as possible to the closing of the valve device.

The slant angle of the cone (i.e. the angle between the side and the longitudinal axis of the cone) can be adapted and can vary along the tapered end portion so that "a certain linear movement of the valve member results in a smaller change of the duct's cross-sectional through-flow area when the valve member is close to its first end position than when the valve member is close to its second end position". The slant angle can be larger at the tip end of the cone and smaller closer to the base of the conical end portion, i.e. closer to the remaining parts of the valve member.

The slant angle of the cone can also be adapted along the tapered end portion so that "the cross-sectional through-flow area varies substantially linearly with the axial position of the valve member". For a duct with a non-varying cross section, this can be achieved by letting the slant angle of the conical end portion be constant over the entire or some portion of the length of the cone. The cone may comprise a plurality of length sections where the slant angle is constant along each section but where the magnitude of the slant angle differs between different sections.

In an embodiment of the invention the duct opening faces an enclosed space, wherein the enclosed space is provided with a further opening allowing a fluid to, provided that the valve device is at least partly open, flow between the duct and the further opening via the duct opening and the enclosed space.

The invention also concerns a system of Rankine type for recovering waste heat of an internal combustion engine, wherein the system comprises: a closed loop for recirculating a fluid; a first heat exchanger configured to evaporate the fluid by transferring heat from a heated medium originating from the engine; an expander configured to expand the fluid that has been evaporated in the first heat exchanger and produce a power output; a second heat exchanger configured to condense the fluid by transferring heat to a flow of cooling medium; a pump for feeding the condensed fluid to the first heat exchanger; a bypass passage configured to allow the fluid to bypass the expander while recirculating in the system; and a bypass valve arranged to control the flow through the bypass passage.

The inventive system is characterized in that the bypass valve is a valve device of the above type.

As described above, such a type of valve device can be controlled without having to switch it on and off at a certain frequency and the ticking noise associated with solenoid valves can thus be avoided. The inventive system is thus more suitable for passenger cars where a ticking noise is more likely to be perceived as disturbing. The inventive system can of course also be used in other applications than a passenger car.

In an embodiment of the system the heated medium originating from the engine is exhaust gas. Preferably the circulated fluid is ethanol, and preferably the expander is connected to an electric generator for production of electricity. This provides for an efficient system.

The invention also concerns a vehicle comprising an internal combustion engine and a system of the above type.

BRIEF DESCRIPTION OF DRAWINGS

In the description of the invention given below reference is made to the following figure, in which.

DESCRIPTION OF EXAMPLE EMBODIMENTS OF THE INVENTION

Figure 1:
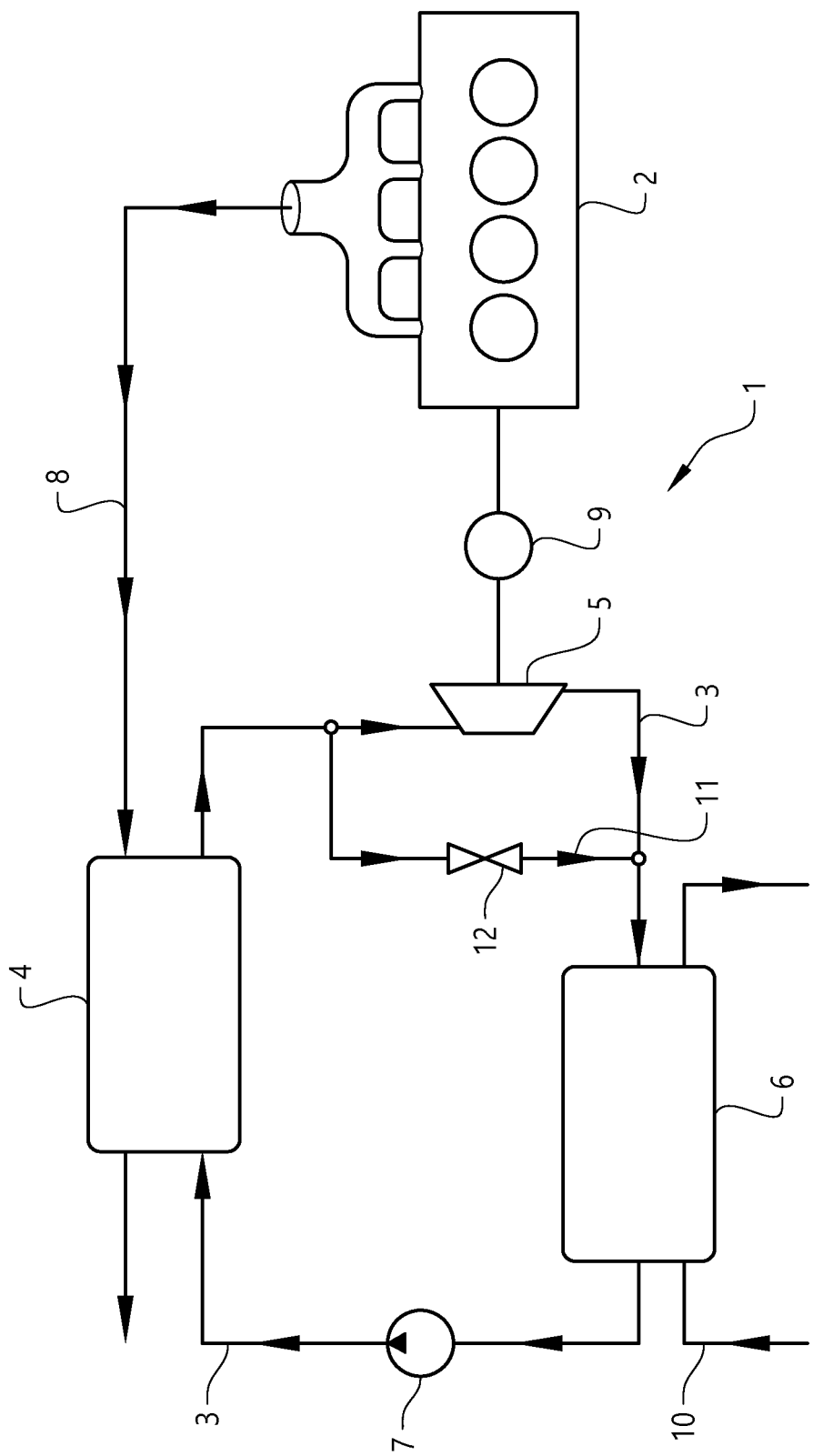
FIG. 1 shows, in a schematic view, a Rankine system provided with a bypass valve.

FIG. 1 shows a system 1 of Rankine type for recovering waste heat of an internal combustion engine 2. The system 1 comprises a closed loop 3 for recirculating a fluid, which in this case is ethanol. The closed loop 3 is arranged so that the fluid can recirculate between the following components (in flow order): a first heat exchanger 4, an expander 5, a second heat exchanger 6, a pump 7 and back again to the first heat exchanger 4.

The first heat exchanger 4 is arranged to evaporate the fluid by transferring heat from a flow of exhaust gas 8 originating from the engine 2. The expander 5 is arranged to expand the evaporated fluid delivered by the first heat exchanger 4 and produce a power output by driving a generator 9 that generates electricity, which can be supplied to the engine 4. The second heat exchanger 6 is arranged to condense the fluid by transferring heat from the fluid to a flow of cooling medium 10. The pump 7 is arranged to feed the condensed fluid to the first heat exchanger 4.

A bypass passage 11 is arranged to allow the fluid to bypass the expander 5 while recirculating in the system 1. A bypass valve 12 is arranged to control the flow through the bypass passage 11.

The bypass passage 11 is mainly used during a start-up phase of the system 1 to avoid that fluid in liquid form is fed to the expander 5, which might damage the expander 5, until a sufficient temperature and pressure has been established in the system.

Figure 2:
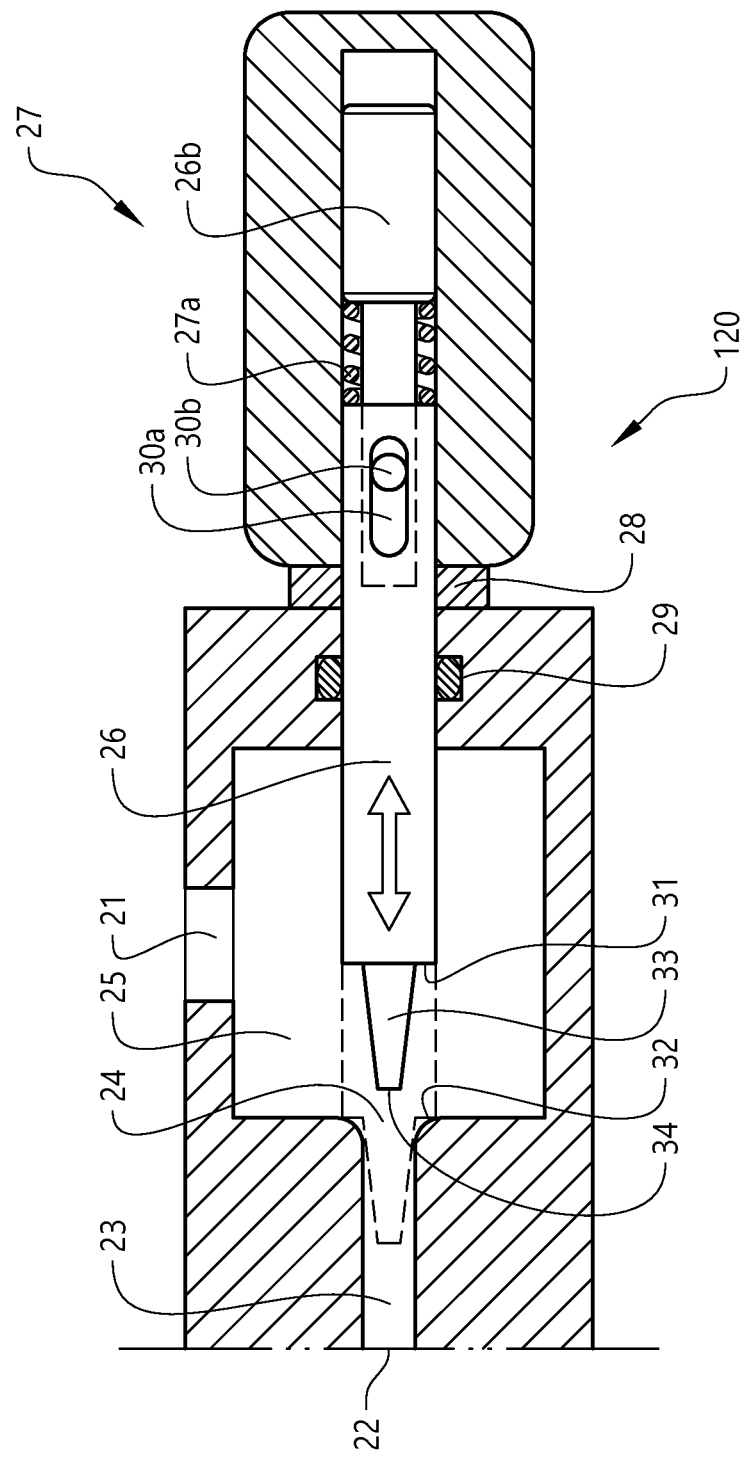
FIG. 2 shows a first embodiment of a valve device according to the invention.

FIG. 2 shows a first embodiment of a valve device 120 suitable for forming the bypass valve 12 in the system 1 shown in FIG. 1. When the valve device 120 is open the fluid can pass the device 120 via the openings 21 and 22 that are in fluid communication via a duct 23, a duct opening 24 and an enclosed space 25.

The valve device 120 further comprises:
- a valve seat 32 (see also FIG. 3) arranged circumferentially around the duct opening 24 and facing away from the duct 23, i.e. at least a portion the seat surface is located radially outside of the duct opening 24 and facing in general in an axial direction away from the duct 22;
- a movable valve member 26 for restricting a flow of fluid through the duct 23 and thus through the valve device 120; and
- a valve actuator 27 for moving the valve member 26, wherein the actuator 27 in this case comprises a spring 27a and an electric motor (not shown).

The valve member 26 comprises in this case two parts: a main part located in the closed space 25 and an outer end part 26b mainly located in association with the actuator 27. The main part of the valve member 26 is axially movable in relation to the outer end part 26b. The spring 27a holds the two parts apart at a certain minimum nominal axial distance from each other. The main part of the valve member 26 can be pressed closer to the end part 26b by overcoming the force of the spring 27a. The end part 26b extends into the main part as indicated in FIG. 2 by a dashed line, an axially elongated opening 30a in the main part of the valve member 26, and a pin 30b that is fixed to the end part 26b and that is moveable along the opening 30a. In general the entire valve member 26, including the end part 26b and the spring 27a, moves as one unit. The valve device 120 is designed so that the spring 27a is somewhat compressed when the valve device 120 is closed (to protect the seat 32 from damage of a strong actuator/electric motor). The spring 27a may also be compressed by a high fluid pressure in the duct 23, in which case the valve can work as release valve.

FIG. 2 also shows means 28 for adjusting the load of the spring and a bushing 29 for the valve member 26.

The valve member 26 and the valve actuator 27 are arranged on an opposite side of the duct opening 24 in relation to the duct 23. The valve member 26 is provided with a valve sealing element in the form of a sealing surface 31 for sealing against the seat 32 around the duct opening 24. The sealing surface 31 has an annular shape. The valve member 26 is movable towards (to the left in FIG. 2) and away from (to the right in FIG. 2) the duct opening 24 in an axial direction thereof.

The valve seat 32 and the sealing surface 31 are schematically depicted in FIG. 2; a part of the valve seat 32 is rounded while the sealing surface 31 is not. Typically, the shape of the seat 32 and the sealing surface 31 should be more adapted to each other; for instance, the seat 32 may be less rounded and the surface 31 may be somewhat rounded to match each other better. In an alternative both the seat 32 and the sealing surface 31 are flat. Such flat surfaces may be inclined in relation to a radial direction of the valve member 26.

The valve seat 32 and the matching sealing surface 31 of the valve member 26 face each other in the axial direction so as to, when brought in contact with each other, define a first axial end position of the valve member 26 in which the valve device 120 is closed. This closed end position is indicated with dashed lines in FIG. 2. The valve member 26 is movable between the closed first end position and a second end position in which the valve member sealing surface 31 is located at an axial distance from the valve seat 32 and the valve device 120 is open. This open second end position is shown with solid lines in FIG. 2. The valve actuator 27, i.e. the electric motor in this case, is configured to move the valve member 26 in the axial direction between the first and second end positions.

The valve member 26 is, in addition to the valve sealing element 31, provided with a valve controlling element in the form of an elongated tapered end portion 33 with a tip end 34 facing the duct 23, i.e. away from the other parts of the valve member 26, away from the actuator 27, and in the opposite end in relation to the outer end part 26b. The tapered end portion 33 is arranged to be inserted through the opening 24 and into the duct 23 as the valve member 26 is moved towards the valve seat 32. The size and shape of the tapered end portion 33 is thus such that it fits into the duct 23 and it is located onto the valve member 26 in such a way as to be inserted through the opening 24 and into the duct 23 as the valve member 26 is moved towards the valve seat 32.

The actuator 27, i.e. the electric motor, is also configured to be capable of holding the valve member 26 in at least one intermediate position between the first and second end positions, i.e. in a position somewhere in between the two axial positions indicated in FIG. 2. In this intermediate position the tapered end portion 33 occupies a portion of a cross-sectional fluid through-flow area defined by the duct 23 so as to partly restrict a flow of fluid through the duct 23.

In this example the electric motor of the actuator 27 is further configured to be capable of holding the valve member 26 in a plurality of intermediate positions between the first and second end positions, in which plurality of positions the tapered end portion 33 occupies a varying portion of the cross-sectional through-flow area of the duct 23 and thus to a different degree restricts a flow of fluid through the duct 23.

The actuator 27 is arranged to exert a linear force onto the valve member 26 and the actuator 27 is arranged at an end portion of the valve member 26 opposite to the elongated tapered end portion 33. Electric motors, pistons etc. for the purpose of holding the valve member 26 in a plurality of axial positions are known as such. The spring 27a exerts a force onto the main part of the valve member 26 that is directed towards the valve seat 32. Such a spring arrangement for valves is also known as such.

Figure 3:
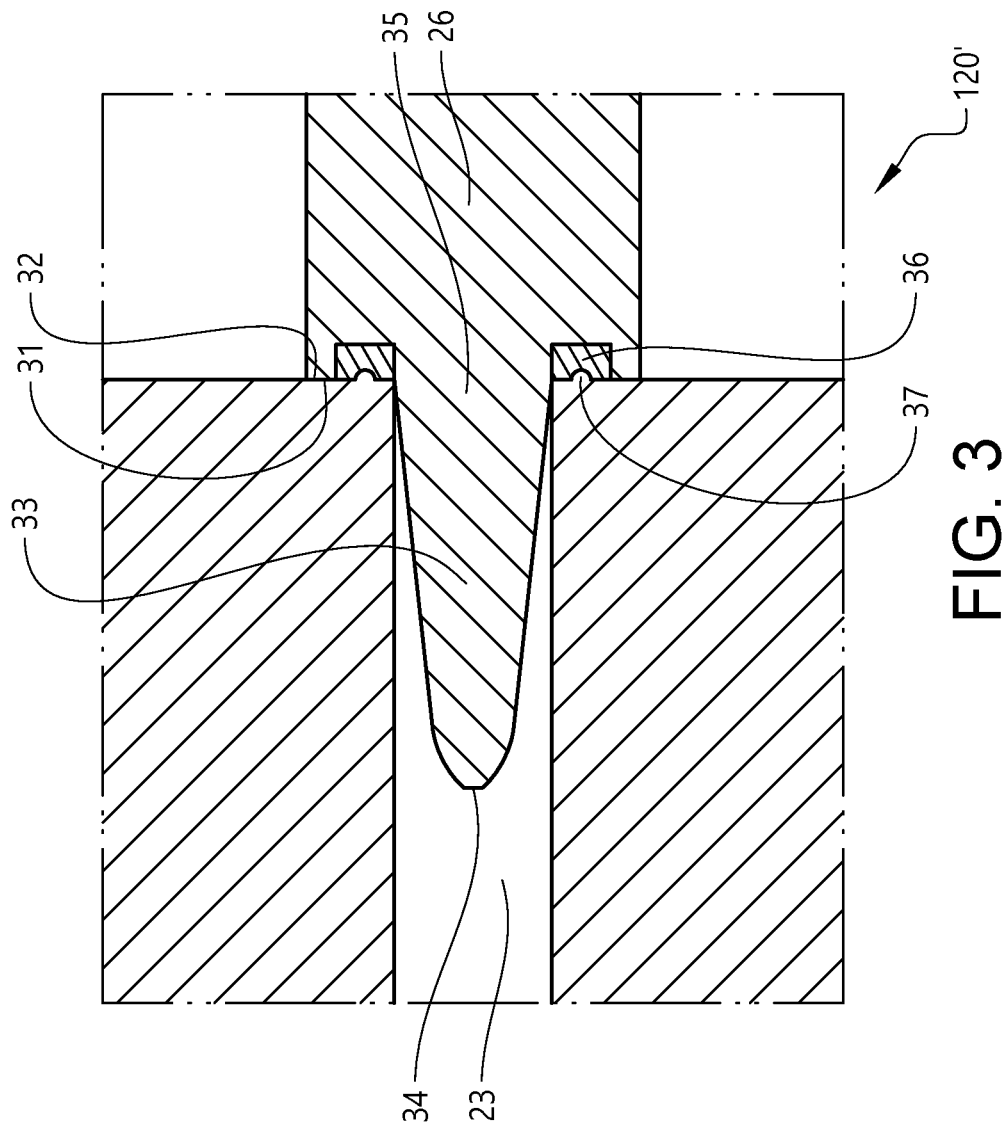
FIG. 3 shows a detail of a second embodiment of a valve device according to the invention.

In the examples shown here the duct 23 has a circular cross section and the elongated tapered end portion 33 has a circular conical shape. In FIG. 2 the schematically depicted end portion 33 has a frusto-conical shape. In FIG. 3 the slant angle of the conical end portion 33 is not the same over the entire axial length of the end portion 33.

FIG. 3 shows a detail of a second embodiment of a valve device 120' according to the invention. The same reference numbers are used in FIGS. 2 and 3 for the same or similar details.

FIG. 3 shows the valve device 120' in a closed position, i.e. the valve member 26 is in its closed first axial end position. The valve seat 32 comprises in this case a flat annular surface that extends circumferentially around the opening of the duct 23 and faces in the axial direction. An annular protrusion 37 is arranged in the valve seat 32. The sealing surface 31 on the valve member 26 matches the seat 32. The sealing surface 31 comprises an annular cut-out provided with a sealing 36 positioned to press against the protrusion 37 when the valve device 120' is closed. The annular sealing 36 is made of PTFE (polytetrafluororethylene) or other suitable material that can adapt to the shape of the protrusion 37 and provide for a good seal.

The tapered end portion 33 has a base 35 with a diameter nearly the same as the inner diameter of the duct 23 so as to contribute to the closing of the valve device 120'.

Figure 4:
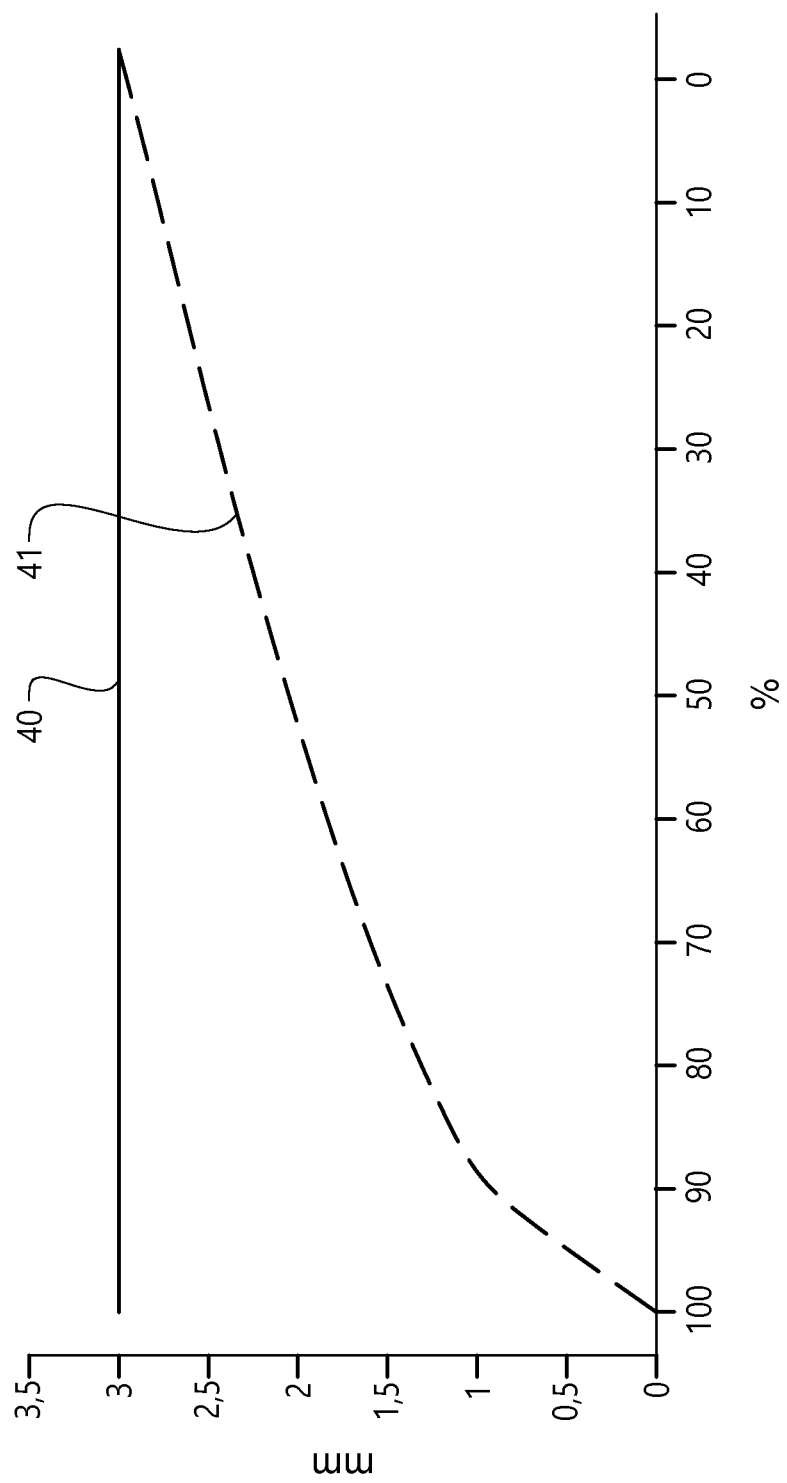
FIG. 4 shows an example of the dimensions of a tapered end portion of a valve member forming part of a valve device according to the invention.

FIG. 4 shows an example of suitable dimensions of a tapered end portion 33 and a duct 23 similar to what is shown in FIG. 3. Solid line 40 in FIG. 4 represents an inner wall of the duct 23 and dashed line 41 represents one of the sides of the tapered end portion 33. The x-axis is aligned with a longitudinal centre axis of the end portion 33 (and of the valve member 26) so what is shown in FIG. 4 is a form of representation of a side view of a(n upper) half of the duct 23. The unit on the y-axis is mm and it can be seen that the duct 23 has in this example a radius of 3 mm (and thus a diameter of 6 mm).

The unit on the x-axis is percent of the cross-sectional through-flow area of the duct 23 that is non-obstructed by the end portion 33 and thus available for fluid through-flow at a certain radius (or diameter) of the end portion 33 given by dashed line 41. Another way to say this is that dashed line 41 gives the radius of the end portion 33 to obtain a certain reduced cross-sectional through-flow area of the duct 23, which gives a corresponding reduction of the flow through the duct 23 when the valve is used in for instance the system of FIG. 1.

As an example, if the end portion 33 is inserted only a little into the duct 23 so that the radius of the inserted section is only 1 mm, the free through flow area in the duct is 90% of the nominal value (i.e. the maximum value when the end portion 33 is not located in the duct 23 at all and the valve is fully open). As another example, a reduction of the nominal value of the cross-sectional area to 50% is obtained if the radius of the inserted section is around 2 mm. If the entire end portion 33 is inserted into the duct 23, which corresponds to the closed first end position of the valve member 26, the free through-flow area is close to 0%.

The x-axis in FIG. 4 also implicitly shows the axial length of the tapered end portion 33, which in this example is around 8 mm. As a general rule, the length of the tapered portion 33 should be greater than the diameter of the duct 23, at least when each of the duct 23 and the end portion 23 has a circular cross-section.

FIG. 4 further shows that the slant angle of the tapered end portion 33 is substantially constant between 100% and around 90% as well as between around 85% and 0%, i.e. the dashed line 41 is substantially straight in these two intervals. An effect of this is that, within each of these two intervals, the cross-sectional through-flow area of the duct 23 varies substantially linearly with the axial position of the valve member 26. Further, in the interval 100-90%, i.e. at the tip end of the end portion 33, the slant angle is larger than in the interval 85-0%. An effect of this is that a certain linear movement of the valve member 26 results in a smaller change of the duct's 23 cross-sectional through-flow area when the valve member 26 is close to its first end position than when the valve member 26 is close to its second end position.

The invention is not limited by the embodiments described above but can be modified in various ways within the scope of the claims. For instance, the valve seat and the sealing surface of the valve member can have other shapes than exemplified above. Further, the expander does not necessarily have to produce electricity as power output but may instead be mechanically connected to the internal combustion engine using gears or belt drive.

What is claimed is:

1. A system of Rankine type for recovering waste heat of an internal combustion engine, wherein the system comprises:
    a closed loop for recirculating a fluid;
    a first heat exchanger configured to evaporate the fluid by transferring heat from a heated medium originating from the engine;
    an expander configured to expand the fluid that has been evaporated in the first heat exchanger and produce a power output;
    a second heat exchanger configured to condense the fluid by transferring heat to a flow of cooling medium;
    a pump for feeding the condensed fluid to the first heat exchanger;
    a bypass passage configured to allow the fluid to bypass the expander while recirculating in the system; and
    a bypass valve device arranged to control the flow through the bypass passage,
    wherein the bypass valve device comprises:
        a duct and a duct opening;
        a valve seat arranged circumferentially around the duct opening and facing away from the duct;
        a movable valve member for restricting a flow of fluid through the duct; and
        a valve actuator for moving the valve member,
            wherein the valve member and the valve actuator are arranged on an opposite side of the duct opening in relation to the duct,
            wherein the valve member is provided with a valve sealing element in the form of a sealing surface for sealing against the seat around the duct opening,
            wherein the valve member is movable towards and away from the duct opening in an axial direction thereof,
            wherein the valve seat and the sealing surface face each other in the axial direction so as to, when brought in contact with each other, define a first end position of the valve member in which the valve device is closed,
            wherein the valve member is movable between the closed first end position and a second end position in which the valve member sealing surface is located at an axial distance from the valve seat and the valve device is open;
            wherein the valve actuator is configured to move the valve member between the first and second end positions, wherein the valve member in addition to the valve sealing element is provided with a valve controlling element in the form of an elongated tapered end portion with a tip end facing the duct,
            wherein the tapered end portion is arranged to be inserted through the opening and into the duct as the valve member is moved towards the valve seat, and
            wherein the actuator is configured to be capable of holding the valve member in at least one intermediate position between the first and second end positions, in which intermediate position the tapered end portion occupies a portion of a cross-sectional fluid through-flow area defined by the duct so as to partly restrict a flow of fluid through the duct.

2. The system according to claim 1, wherein the actuator of said valve device is configured to be capable of holding the valve member in a plurality of intermediate positions between the first and second end positions, in which plurality of positions the tapered end portion occupies a varying portion of the cross-sectional through-flow area of the duct and thus to a different degree restricts a flow of fluid through the duct.

3. The system according to claim 1, wherein the actuator of said valve device is arranged to exert a linear force onto the valve member.

4. The system according to claim 1, wherein the actuator of said valve device comprises an electric motor.

5. The system according to claim 1, wherein the actuator of said valve device comprises a spring.

6. The system according to claim 1, wherein the actuator of said valve device is arranged at an end portion of the valve member opposite to the elongated tapered end portion.

7. The system according to claim 1, wherein the shape of the tapered end portion of said valve member in relation to the cross-sectional through-flow area of the duct is such that a certain linear movement of the valve member results in a smaller change of the duct's cross-sectional through-flow area when the valve member is close to its first end position than when the valve member is close to its second end position.

8. The system according to claim 1, wherein the shape of the tapered end portion of said valve member in relation to the cross-sectional through-flow area of the duct is such that, at least along half of the length of the tapered end portion in the axial direction thereof, the cross-sectional through-flow area varies substantially linearly with the axial position of the valve member.

9. The system according to claim 1, wherein the tapered end portion of said valve member has a conical shape.

10. The system according to claim 1, wherein the duct opening of said valve device faces an enclosed space, wherein the enclosed space is provided with a further opening allowing a fluid to, provided that the valve device is at least partly open, flow between the duct and the further opening via the duct opening and the enclosed space.

11. The system according to claim 1, wherein the heated medium originating from the engine is exhaust gas.

12. The system according to claim 1, wherein the fluid is ethanol.

13. The system according to claim 1, wherein the expander is connected to an electric generator for production of electricity or mechanically connected to the internal combustion engine.

14. A vehicle comprising an internal combustion engine and a system according to claim 1.

\* \* \* \* \*